July 29, 1958     E. PFARRWALLER     2,845,095
THREAD CLAMP HAVING TWO MOVABLE JAWS
Filed Oct. 11, 1954
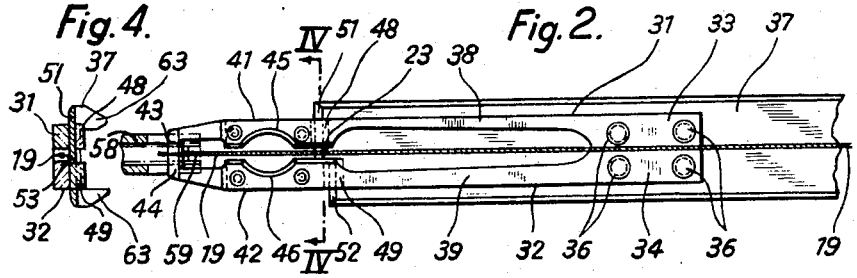
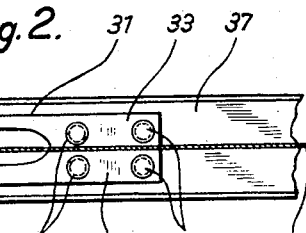
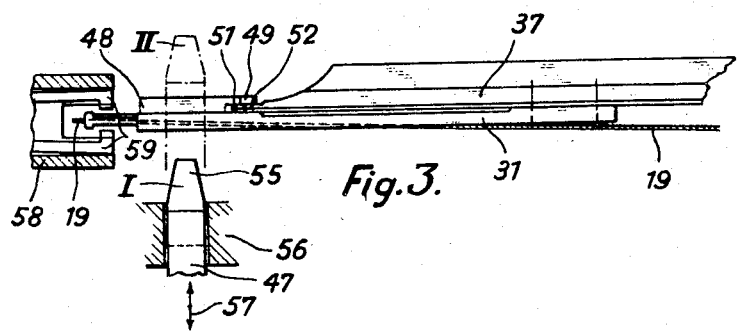
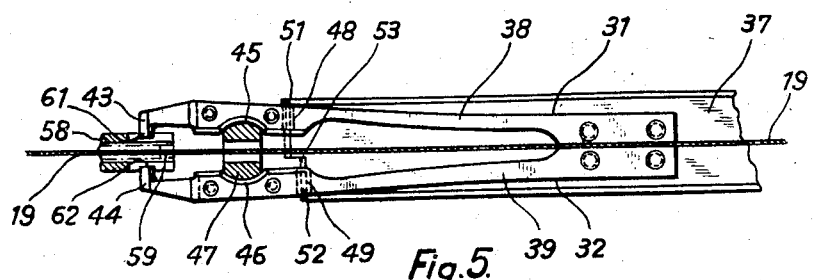
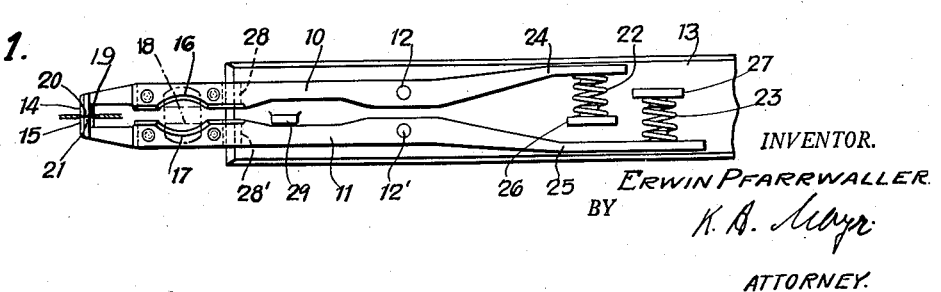
INVENTOR.
ERWIN PFARRWALLER
BY K. A. Meyr
ATTORNEY.

United States Patent Office 2,845,095
Patented July 29, 1958

2,845,095

THREAD CLAMP HAVING TWO MOVABLE JAWS

Erwin Pfarrwaller, Winterthur, Switzerland, assignor to Sulzer Frères, Societe Anonyme, Winterthur, Switzerland, a corporation of Switzerland Application October 11, 1954, Serial No. 461,625

Claims priority, application Switzerland October 29, 1953

9 Claims. (Cl. 139—127)

The present invention relates to thread clamps as used, for example, in looms for weaving. The thread clamp according to the invention has two movable jaws which, when in clamping position, are pressed against each other by means of a predetermined clamping force and which are spread apart for opening the clamp by means of a clamp opener. The clamps according to the invention are suitable for temporarily holding one or more threads, particularly for transferring threads to or receiving threads from another clamp.

The clamp according to the invention comprises an abutment for determining the clamping position of one of the jaws, the jaw whose clamping position is determined by the abutment or a part moving therewith being positively engaged by the abutment.

The novel features which are considered characteristic of the invention are set forth with particularity in the appended claims. The invention itself however and additional objects and advantages thereof will best be understood from the following description of embodiments thereof when read in conjunction with the accompanying drawing, in which:

Fig. 1 is a side elevation of a thread clamp according to the invention, having rigid jaw members;

Fig. 2 is a side elevation of a modified thread clamp according to the invention mounted on a carrier or holder, the jaws being in clamping position;

Fig. 3 is a top view of the clamp shown in Fig. 2 and includes a diagrammatic illustration of a clamp opener;

Fig. 4 is a section of the clamp shown in Fig. 2, the section being made along line IV—IV in Fig. 2;

Fig. 5 is a side elevation of the thread clamp according to Figs. 2 to 4 in open position.

The same numerals designate the same parts in all figures.

In the thread clamp illustrated in Fig. 1, the jaw members 10 and 11 are formed by rigid two-arm levers. The jaw members 10 and 11 individually swing on bolts 12 and 12', respectively, the bolts being mounted on a clamp carrier or holder 13. The left ends of the members 10 and 11 are provided with jaw portions 14 and 15 and with recesses 16 and 17, respectively, for receiving a clamp opener 18 shown in dash-dot lines. The jaw portions 14 and 15 are shown in closed position in which a thread 19 is temporarily held between two opposed clamping surfaces 20 and 21 at the ends of the jaw portions. The clamping surfaces are pressed against each other by pretensioned springs 22 and 23 which act on the arms 24 and 25 of the clamping members 10 and 11, respectively.

The springs 22 and 23 rest on spring plates 26 and 27, respectively, which are mounted on the holder 13. The members 10 and 11 are individually provided with brackets 28 and 28', respectively, which embrace the left end of the clamp holder 13.

An abutment 29 is mounted on the holder 13 against which abutment the member 11 abuts when the clamp is in closed position. The abutment 29 determines the position of the clamp portion 15 and of the member 11 relatively to the clamp holder 13, so that the elevation of the clamping point formed by the clamping surfaces 20 and 21 is ensured at all times.

In order to ensure positive engagement of the member 11 with the abutment 29, the arm 25 of the member 11 is longer and projects beyond the arm 24 of the member 10, the distance of the position of the spring 23 from the fulcrum 12' being greater than the distance of the position of the spring 22 from the fulcrum 12. If this increased leverage is not sufficient, a greater pretensioning force of the spring 23 may be obtained by using a stronger spring, or by using a helical spring 23 which has more windings than the helical spring 22, and by making the spring 23 of the same length as the spring 22. In this case, the distances between the arms 24 and 25 and the spring plates 26 and 27, respectively, are the same. The last described arrangement is of particular importance if the two springs are arranged one above the other, in which case the spring plates 26 and 27 may be combined into a single plate.

The thread clamp illustrated in Fig. 2 includes two resilient jaw members 31 and 32, whose right ends are rigidly connected by means of rivets 36 with a clamp carrier or holder 37. The members 31 and 32 individually include a resilient portion 38 and 39, respectively, a portion 41 and 42 for receiving a clamp opener, and clamp portions 43 and 44, respectively. The portions 41 and 42 are provided with recesses 45 and 46, respectively, adapted to receive an opener thorn 47 (Fig. 3). Brackets 48 and 49 are riveted to the portions 41 and 42, respectively, the brackets embracing the web portions 51 and 52, respectively, at the left end of the holder 37. The brackets 48 and 49 prevent lifting of the members 31 and 32 from the holder 37 without impairing their mobility for opening and closing the thread clamp.

The upper part 51 of the left end of the web of the holder 37 projects beyond the recessed lower part 52 of the left end of the web of the holder, and forms an abutment 53 for the lower clamp member 32 whose bracket 49 abuts against the abutment 53 when the thread clamp is in closed position. This is shown in Fig. 4.

The operation of the device is as follows:

The individual jaw members 31 and 32 have portions 38 and 39, respectively, which are resilient. These portions are pre-bent and hardened when the jaw is made, with the result that after the right ends 33 and 34 of the members 31 and 32, respectively, have been riveted to the holder 37, the jaw portions 43 and 44 are pressed against each other with a predetermined force, the force depending on the pretensioning or pre-bending of the portions 38 and 39. This force is at least so great that the thread 19 held between the closed jaw portions 43 and 44 cannot be pulled out of the clamp.

The conical end 55 of the opening member 47 corresponds to the beveled edges of the recesses 45 and 46, so that the clamp 31, 32 can be reliably operated without becoming worn. The opener thorn 47 guided in a guide 56 (Fig. 3) reciprocatingly moves in the direction of the of the arrows 57 perpendicularly to the clamp 31, 32 from a rest position I shown in solid lines to an operating position II shown in dash-dot lines, and back from position II to position I, depending, for example, on the rotation and position of the main drive shaft of the loom. The thorn 47 has an axial slot accommodating the thread which is acted on by the clamp.

The abutment 53 formed by a recess at the free end of the lower portion of the holder 37 positively defines the position of the jaw member 32 and of its jaw portion 44 in the closed or clamping position of the clamp.

The jaw portion 44 cannot move beyond this position because the bracket 49 rests on the abutment 53, as seen in Fig. 4. The jaw portion 43 rests on the jaw portion 44 when the clamp is closed. Due to this arrangement, the position relatively to the clamp carrier 37 of the end of the thread 19 gripped by the clamp is always the same.

This is very important if the clamp according to the invention is used in connection with a thread return member, for example, as shown in Patent No. 2,163,760 and in my copending application Serial No. 376,780, filed August 27, 1953, now Patent No. 2,783,778. The thread return member grips a weft thread 19 at the edge of the shed after the thread has been inserted by means of a gripper shuttle 58 (Fig. 4). Thereupon, the weft thread 19 is cut and its free end is returned by the thread return member from the edge of the fabric to the place where the thread is transferred to another shuttle. The free end of the thread is transferred by the thread return member to a new shuttle 58 or rather to its thread clamp 59, as seen in Figs. 3 and 5. In this operation, it is of extreme importance that the elevation of the clamping point of the thread clamp of the thread return member should be always exactly the same, for the following reasons:

Without the abutment 53, the elevation of the clamping point, i. e., the place where the clamping faces 61 and 62 of the clamp portions 43 and 44, respectively, abut each other, is not exactly defined. This elevation will vary within certain limits. Since the plane in which the thread clamp 59 of the shuttle 58 moves is perpendicular to the plane in which the clamp 31, 32 moves, the height of the clamping faces of the shuttle clamp 59 would have to be made greater by the distance between the two aforementioned extreme positions of the gripping point of the clamp portions 43 and 44, if no abutment 53 is provided for one jaw member (32) for maintaining the elevation of the clamping point of the clamp 31, 32.

Provision of the abutment 53 has the advantage of a smaller thread clamp 59 for the shuttle 58 and consequently of a smaller shuttle. Reduction of the thickness of the shuttle is of advantage when designing the parts of the loom through which the shuttle passes.

The resilient portion 39 of the clamp member 32 has a greater cross section than the resilient portion 38 of the member 31, so that the resilient force which presses the jaw portion 44 into closing position is greater than the pressure at which the jaw portion 43 is forced into closing position. This ensures reliable abutment of the member 32 against the abutment 53 because the clamp portion 43 which is subjected to a smaller force cannot move the member 32 from the abutment 53. The force acting on the thread 19 is not determined by the resilient portion 39 but by the smaller force of the resilient portion 38. If the clamp holder 37 serves as thread return member and is reciprocated, the web of the holder is provided with guide parts 63 (Fig. 4) which move in stationary guide grooves in the loom frame and, in the case of looms having gripper shuttles, in the casing of the picking mechanism.

The thread clamps can not only be used in looms for weaving, but in all machines in which a thread is to be presented to a tool, as for example in throwing machines, knotting machines, packing machines, machines for making tags, etc.

While specific embodiments of the invention have been shown and described, it will be apparent to those skilled in the art that various changes, modifications, substitutions, additions and omissions may be made therein without departing from the spirit and scope of the invention as set forth in the appended claims.

What is claimed is:

1. A thread clamp for temporarily holding one or more threads in a loom for weaving, comprising a holder, two jaw members movably mounted on said holder, resilient means associated with said jaw members for pressing said jaw members against each other for gripping a thread, and an abutment mounted on said holder and adapted to abut against and to limit the closing movement of one of said jaw members.

2. A thread clamp as defined in claim 1, in which said jaw members individually have a first portion rigidly connected with said holder, a resilient portion extending from said first portion, and a clamp portion extending from said resilient portion, the resilient portion of the jaw member abutting against said abutment being stiffer than the resilient portion of the other jaw member.

3. A thread clamp as defined in claim 1, in which said jaw members are formed as rigid levers fulcrumed to said holder, and said resilient means are formed by springs having one end connected with said holder and another end abutting against one of said jaw members, the spring abutting against the jaw member which abuts against said abutment being stronger than the spring abutting against the other jaw member.

4. A thread clamp according to claim 1, in which said jaw members are formed as two-arm levers fulcrumed to said holder, and said resilient means are formed by springs having one end connected with said holder and another end abutting against one arm of said jaw members, the spring abutting against the jaw member which abuts against said abutment abutting against the jaw member at a point which is more remote from the fulcrum of said jaw member than is the point at which the other spring abuts against the other jaw member from the fulcrum of the other jaw member.

5. A thread clamp according to claim 1, in which said jaw members have a portion embracing said holder and said holder has a recessed portion embraced by and forming an abutment for one of said jaw members.

6. A thread clamp for temporarily holding one or more threads in a loom for weaving, comprising a holder, resilient means connected with said holder, two two-arm levers separately fulcrumed to said holder, one arm of each of said levers being engaged by said resilient means, the other arm of said levers forming a jaw, the jaws of said levers facing and being pressed against each other by the action of said resilient means for gripping a thread.

7. A thread clamp as defined in claim 6, in which said levers in their entirety are placed on opposite sides of the thread.

8. A thread clamp as defined in claim 6, in which each lever has an individual fulcrum and the fulcrums of said levers are spaced from each other.

9. A thread clamp as defined in claim 1, including an opener thorn for moving said jaw members apart and having an axial slot accommodating the thread which is acted on by the thread clamp.

References Cited in the file of this patent

UNITED STATES PATENTS

| | | |
|---|---|---|
| 2,163,760 | Moessinger | June 27, 1939 |
| 2,413,155 | Rickelmann | Dec. 24, 1946 |
| 2,728,359 | Pfarrwaller | Dec. 27, 1955 |